(12) United States Patent
Askeland et al.

(10) Patent No.: US 6,441,922 B1
(45) Date of Patent: *Aug. 27, 2002

(54) REDUCTION OF BANDING IN INCREMENTAL PRINTING, THROUGH SELECTION AMONG COLORIMETRIC EQUIVALENTS

(75) Inventors: Ronald A Askeland, San Diego, CA (US); Kevin R Hudson, Camas, WA (US); Thomas S. Hoff, San Diego, CA (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/184,577

(22) Filed: Oct. 31, 1998

(51) Int. Cl.[7] .............................................. G06K 15/00
(52) U.S. Cl. ....................... 358/1.9; 358/1.15
(58) Field of Search ................... 358/1.1, 1.9, 1.13, 358/1.14, 533, 454, 523, 504, 500, 524, 115–116; 382/167, 162; 345/600–605, 549, 550, 563, 546

(56) References Cited

U.S. PATENT DOCUMENTS 5,408,342 A * 4/1995 Kumada et al. .............. 358/1.9
5,664,072 A * 9/1997 Ueda et al. ................... 358/1.9

FOREIGN PATENT DOCUMENTS

| EP | 0632405 A | 1/1995 | .......... G06K/15/10 |
| EP | 0647059 A | 4/1995 | .......... H04N/1/405 |
| EP | 0863478 A | 9/1998 | .......... G06K/15/10 |
| EP | 0864429 A | 9/1998 | .............. B41J/2/21 |
| EP | 0944024 A | 9/1999 | .......... G06K/15/10 |

* cited by examiner

Primary Examiner—Arthur G. Evans

(57) ABSTRACT

Apparatus and method establish two or more selectable colorimetrically equivalent printmasks, and—from among those—select masks for use. An image-processing stage assigns inking spatially among pixels; each mask sets temporal assignments, among print passes, of the spatially assigned inking. Selected masks are used, for successive pixels, in a randomized sequence. The image is defined as an array of input colorimetric levels, each one selectably mapped to any one of plural colorimetrically equivalent masks. Plural colorimetrically equivalent levels are defined, and then assigned (through a randomized procedure) to particular masks. The image is prepared using a pixel grid coarser than the available printer resolution; and the plural equivalent masks formed by varying allocation of printer passes among pixels of the coarser grid.

26 Claims, 17 Drawing Sheets

Halftone
Level       Shingle Mask

Level 3: 4 drops

3  | 12 | 12 | 12 | 12 | 12 | 12 | 12 | 12 |
   | 12 | 12 | 12 | 12 | 12 | 12 | 12 | 12 |
   | 12 | 12 | 12 | 12 | 12 | 12 | 12 | 12 |
   | 12 | 12 | 12 | 12 | 12 | 12 | 12 | 12 |

Level 2: 2 drops

2  | 1 | 2 | 1 | 2 | 2 | 1 | 2 | 1 |
   | 1 | 2 | 1 | 2 | 2 | 1 | 2 | 1 |
   | 2 | 1 | 2 | 1 | 1 | 2 | 1 | 2 |
   | 2 | 1 | 2 | 1 | 1 | 2 | 1 | 2 |

Level 1: 1 drop

1  | 1 |   | 2 |   | 1 |   | 2 |   |
   | 1 |   | 2 |   | 1 |   | 2 |   |
   | 2 |   | 1 |   | 2 |   | 1 |   |
   | 2 |   | 1 |   | 2 |   | 1 |   |

Level 0: 0 drops

Halftone Level | Shingle Mask

Level 3: 4 drops (Halftone Level 3)

| 12 | 12 | 12 | 12 | 12 | 12 | 12 | 12 |
|----|----|----|----|----|----|----|----|
| 12 | 12 | 12 | 12 | 12 | 12 | 12 | 12 |
| 12 | 12 | 12 | 12 | 12 | 12 | 12 | 12 |
| 12 | 12 | 12 | 12 | 12 | 12 | 12 | 12 |

Level 2A: 2 drops (Halftone Level 2)

| 1 | 2 | 1 | 2 | 2 | 1 | 2 | 1 |
|---|---|---|---|---|---|---|---|
| 1 | 2 | 1 | 2 | 2 | 1 | 2 | 1 |
| 2 | 1 | 2 | 1 | 1 | 2 | 1 | 2 |
| 2 | 1 | 2 | 1 | 1 | 2 | 1 | 2 |

Level 2B: 2 drops

| 1 | 1 | 2 | 1 | 2 | 2 | 1 | 2 |
|---|---|---|---|---|---|---|---|
| 1 | 1 | 2 | 1 | 2 | 2 | 1 | 2 |
| 2 | 2 | 1 | 2 | 1 | 1 | 2 | 1 |
| 2 | 2 | 1 | 2 | 1 | 1 | 2 | 1 |

Level 1A: 1 drop (Halftone Level 1)

| 1 |   | 2 |   | 1 |   | 2 |   |
|---|---|---|---|---|---|---|---|
| 1 |   | 2 |   | 1 |   | 2 |   |
| 2 |   | 1 |   | 2 |   | 1 |   |
| 2 |   | 1 |   | 2 |   | 1 |   |

Level 1B: 1 drop

| 1 |   | 1 |   | 2 |   | 2 |   |
|---|---|---|---|---|---|---|---|
| 1 |   | 1 |   | 2 |   | 2 |   |
| 2 |   | 2 |   | 1 |   | 1 |   |
| 2 |   | 2 |   | 1 |   | 1 |   |

Level 0: 0 drops (Halftone Level 0)

|   |   |   |   |   |   |   |   |
|---|---|---|---|---|---|---|---|
|   |   |   |   |   |   |   |   |
|   |   |   |   |   |   |   |   |
|   |   |   |   |   |   |   |   |

| Initial Halftone Levels | Redundant Halftone Levels | Shingle Mask |
|---|---|---|
| | | *Level 5: 4 drops* |
| 3 | 5 | 1 2 1 2 2 1 2 1 / 1 2 1 2 2 1 2 1 / 2 1 2 1 1 2 1 2 / 2 1 2 1 1 2 1 2 |
| | | *Level 4: 2 drops* |
| 2 | 4 | 1 2 1 2 2 1 2 1 / 1 2 1 2 2 1 2 1 / 2 1 2 1 1 2 1 2 / 2 1 2 1 1 2 1 2 |
| | | *Level 3: 2 drops* |
| 2 | 3 | 1 1 2 1 2 2 1 2 / 1 1 2 1 2 2 1 2 / 2 2 1 2 1 1 2 1 / 2 2 1 2 1 1 2 1 |
| | | *Level 2: 1 drop* |
| 1 | 2 | 1 _ 2 _ 1 _ 2 _ / 1 _ 2 _ 1 _ 2 _ / 2 _ 1 _ 2 _ 1 _ / 2 _ 1 _ 2 _ 1 _ |
| | | *Level 1: 1 drop* |
| 1 | 1 | _ 1 _ 1 _ 2 _ 2 / _ 1 _ 1 _ 2 _ 2 / _ 2 _ 2 _ 1 _ 1 / _ 2 _ 2 _ 1 _ 1 |
| | | *Level 0: 0 drops* |
| 0 | 0 | (empty grid) |

| Tone levels (entry) | Diffusion | Base-level error term | Threshold error term |
|---|---|---|---|
| 120 | 0 | 120 | 128 |
| 121 | 0 | 121 | 128 |
| 122 | 0 | 122 | 128 |
| 123 | 0 | 123 | 128 |
| 124 | 0 | 124 | 128 |
| 125 | 0 | 125 | 128 |
| 126 | 0 | 126 | 128 |
| 127 | 0 | 127 | 128 |
| 128 | 1 | 0 | 96 |
| 129 | 1 | 1 | 96 |
| 130 | 1 | 2 | 96 |
| 131 | 1 | 3 | 96 |
| 132 | 1 | 4 | 96 |
| 133 | 1 | 5 | 96 |
| 134 | 1 | 6 | 96 |
| 135 | 1 | 7 | 96 |
| 136 | 1 | 8 | 96 |
| 137 | 1 | 9 | 96 |

FIG. 10

| Tone levels (entry) | Diffusion | Base-level error term | Threshold error term |
|---|---|---|---|
| 120 | 0 | 120 | 128 |
| 121 | 0 | 121 | 128 |
| 122 | 0 | 122 | 128 |
| 123 | 0 | 123 | 128 |
| 124 | 0 | 124 | 128 |
| 125 | 0 | 125 | 128 |
| 126 | 0 | 126 | 128 |
| 127 | 0 | 127 | 128 |
| 128 | 1 | 0 | 96 |
| 129 | 3 | 1 | 96 |
| 130 | 1 | 2 | 96 |
| 131 | 3 | 3 | 96 |
| 132 | 1 | 4 | 96 |
| 133 | 3 | 5 | 96 |
| 134 | 1 | 6 | 96 |
| 135 | 3 | 7 | 96 |
| 136 | 1 | 8 | 96 |
| 137 | 3 | 9 | 96 |

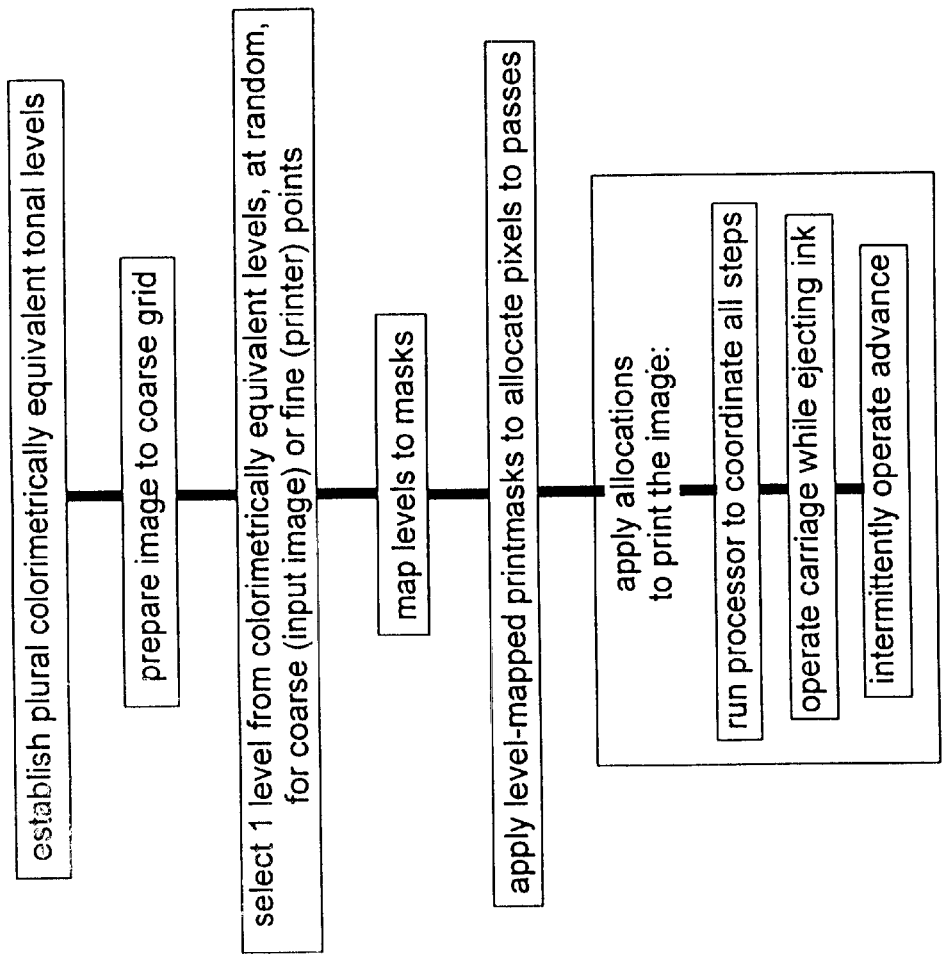

REDUCTION OF BANDING IN INCREMENTAL PRINTING, THROUGH SELECTION AMONG COLORIMETRIC EQUIVALENTS

RELATED PATENT DOCUMENTS

Closely related documents are other, coowned U.S. utility-patent documents filed in the United States Patent and Trademark Office—and also hereby incorporated by reference in their entirety into this document. One is utility-patent application Ser. No. 08/814,949, of Michael Chang et al. (issued as U.S. Pat. No. 6,082,849). Another is Ser. No. 08/957,853, in the names of Doron, Askeland and Chang, and entitled "Method of Generating Randomized Masks to Improve Image Quality on a Printing Medium" (issued as U.S. Pat. No. 6,157,461 . Another such document is Ser. No. 08/960,766, in the names of Chang and Bockman, and entitled "Random Printmasks in a Multilevel Inkjet Printer" (and issued as U.S. Pat. No. 6,178,008). One further such document is Ser. No. 08/961,047 in the names of Kevin R. Hudson et al., entitled "Table Based Fast Error Diffusion Halftoning Technique" (issued as U.S. Pat. No. 6,057,933). Yet another is Ser. No. 09/042,880, in the names of Askeland and Doron, entitled "Banding Reduction in Incremental Printing, through Use of Randomized Superpixels". Still others are Ser. No. 08/810,053, in the names of Serra and Moroney, entitled "Multipass Inkjet Printmodes with Randomized Dot Placement, to Minimize Patterning and Liquid Loading" (issued as U.S. Pat. No. 6,019,454); Ser. No. 08/810,753, in the name of Serra, entitled "Multipass Color Printmasks Based on Location Rules to Minimize Hue Shift, Banding and Coalescence" (issued as U.S. Pat. No. 6,067,405); and finally Ser. No. 09/150,321 through Ser. No. 09/150,323 of Joan Manel Garcia et al., and respectively entitled "MASKS ON DEMAND FOR USE IN INCREMENTAL PRINTING"; "FAST BUILDING OF MASKS FOR USE IN INCREMENTAL PRINTING"; and "OPTIMAL-SIZE AND NOZZLE-MODULATED MASKS FOR USE IN INCREMENTAL PRINTING".

FIELD OF THE INVENTION

This invention relates generally to machines and procedures for incremental printing of text or graphics on printing media such as paper, transparency stock, or other glossy media; and most particularly to a scanning thermal-inkjet machine and method that construct images from individual ink spots created on a printing medium, in a two-dimensional pixel array. The invention is also believed applicable to sister technologies such as the hot wax transfer method. To optimize image quality the invention employs printmode techniques that are in some cases substantially randomized and in other cases arbitrary, but preferred embodiments of some facets of the invention invoke such printmode techniques through upstream tonal-level strategies.

BACKGROUND OF THE INVENTION

A basic goal for these procedures and machines is very high quality in printed images, using a relatively inexpensive printer. Incremental printing nowadays is generally accomplished through digital manipulation of image data in one or another type of electronic digital microprocessor.

All such manipulation, including the stages discussed below under the conventional designations of "image processing" and "printmasking", can be performed in a host computer, e.g. in software that operates an attached printer, or can be built into the printer itself—but most commonly is shared between the two. In still other systems some of the manipulation is performed in yet another distinct product, such as for example a so-called "raster image processor" (RIP) to avoid overcommitting either the computer or the printer.

For operations performed within the printer or within an RIP, as is well known, the product may contain either a general-purpose digital processor running programs called "firmware", or an application-specific integrated circuit (ASIC) manufactured to perform only specific functions of particular printers or RIPs. In some cases the printer or RIP may use both a firmware subsystem and an ASIC.

Image processing—The fundamental task of all these devices is receiving data representing a desired image and developing from those data specific moment-by-moment commands to a printing mechanism. This task, for purposes of the present document, will be called "image processing".

Such processing typically includes, at the outset, some form of darkness and contrast control or adjustment. In a color printer, this preprocessing stage analogously also includes color conversions and any needed color corrections. For purposes of generality in the remainder of this document (except where otherwise clear from the context), the terms "color" and "colorimetric" will be used to encompass nonchromatic as well as chromatic colors, color specifications and the color manipulations just mentioned. Such preprocessing can handle both user-desired color modification and any known mismatch between an input-image color specification and the operating color space and gamut of the printer.

Next downstream from contrast, darkness and other color corrections—and particularly important for images other than text—image processing also includes rendering or rendition techniques (such as dithering of error diffusion). A rendition stage may be regarded as having two principal functions, both directed to making spatial assignments of color ink spots to particular pixels.

First, it attempts to implement the relatively continuous or very fine tonal gradations of a photograph-like image, in terms of the relatively limited number of gradations which a typical inexpensive printer can produce. A digital file in a computer ordinarily is able to represent fine tonal gradations quite accurately, since data formats—although digital—usually allow for at least 256 distinct tonal levels between, for instance, pure white and dead black.

Second, in a color printer, rendition also attempts analogously to implement the relatively huge number of chromatic colors which a computer can invoke. Rendition must accomplish this in terms of the relatively limited number of chromatic colors which a typical inexpensive printer can produce.

Applying the broader definition of "color" suggested four paragraphs above, these two functions essentially collapse into a single broader functional concept. In other words, in the technical parlance of color science for incremental printing, both these functions may be regarded as implementing complex multilevel "color" values, in a printing system that can directly produce only a very limited number of "color" values.

Banding—An obstacle to highest-quality printing is caused by repeating failure of particular elements of the print mechanisms to mark properly—or to mark consistently with other elements. Periodic artifacts arise from constant or repeating errors of inkjet trajectory, pen positioning and speed, and printing-medium positioning and speed.

For instance malfunction or misalignment of a particular inking nozzle or the like can leave a generally consistent white or light pixel row across every image region where that particular element (e.g. nozzle) is supposed to mark. In the case of misalignment, the same problem also produces excess inking across some nearby region where the same element should not be marking.

This very simple example is only meant as a basic introduction to the concept of banding. As will shortly be seen, banding encompasses patterned artifacts that are far, far more complicated, bewildering and difficult to trace, to comprehend or accordingly to eliminate.

Image regions are not all equally affected by such defects. The visual impact or significance of banding problems, or more generally of dot-placement errors, varies with the tonal level or in other words dot density within an image.

We can define three regions of a tonal ramp, based on the amount of white space:

(1) highlights: These areas have ample white space and to the naked eye exhibit little in the way of banding or other dot-placement artifacts.

Such artifacts are of course present, but hard to see—because small differences in dot position can represent only a relatively small fractional change (or none) in the large amount of white space that is seen. Furthermore, because the dots that are present are so far apart, and usually irregularly located, they fail to form a visual frame of reference within which a person can detect placement errors directly.

(2) midtones: These parts of the tonal range are most sensitive to banding because they have small amounts of white space in conjunction with moderate amounts of dot-filled space.

Dot-placement errors are highly visible because small differences in dot position can have a large effect on how much white space is visible—and in many situations also a disproportionate effect on the exact appearance of the moderate amount of dot-filled space. Coalescence contributes further to the conspicuousness of banding and graininess because dots clump together.

(3) saturated areas: These segments of the tonal range have almost no white space showing through, and again as in the highlights tend to exhibit minimal banding effects.

The large amount of colorant on the printing medium hides dot placement errors—with the exception of print-medium advance problems. Interactions between the colorant and the printing medium, however, can lead to flood banding and coalescence.

As a practical matter, the boundaries of these tonal-range segments depend in part upon the nature of the image being printed, as well as the exact character of the dot-placement errors produced by a particular printhead. Therefore these regions of the tonal ramp can be defined neither sharply nor generally.

As a rule of thumb, however, for purposes of placement-error visibility the midtone region has very roughly more than one single printed dot per four pixels—but, at the saturated end of the range, very roughly more than one single dot subtracted from full coverage, per four pixels. For example in a four-level (including zero) system, since the maximum number of dots in each pixel is three, the maximum inking in four pixels is 3×4=12 and the upper limit of the midtone region is 12−1=11 dots per four pixels.

In other words, the high-visibility range lies above approximately twenty-five percent coverage in single dots, but below approximately twenty-five percent in single dots deducted from the maximum possible inking level. Again, in practice the range defines itself in a functional way and not exactly in numerical terms.

Inking and coalescence—To achieve good tonal gradations and (for chromatic-color printers) vivid colors, and to substantially fill the white space between addressable pixel locations, ample quantities of colorant must be deposited. Doing so, however, generally requires subsequent removal of the water or other base—for instance by evaporation and, for some print media, absorption—and this drying step can be unduly time consuming.

In addition, if a large amount of colorant is put down all at substantially the same time, within each section of an image, related adverse bulk-colorant effects arise. These include so-called "bleed" of one color into another (particularly noticeable at color boundaries that should be sharp), "cockle" or puckering of the printing medium, and even "blocking" or offset of colorant in one printed image onto the back of an adjacent sheet. In extreme cases such blocking can cause sticking of the two sheets together, or of one sheet to components of the printer apparatus.

All these conditions of course—like the banding problem discussed in the preceding subsection—defeat the objective of providing the highest practicable quality of printing in a relatively economical printer. Earlier efforts in this field have attempted to address these obstacles.

Printmodes—One useful known technique for dealing with both the above-described problems (i.e., banding and coalescence) is laying down in each pass of a printhead only a fraction of the total colorant required in each section of the image. Any areas left white or light in each pass tend to be filled in during one or more later passes.

These techniques, known as "printmodes", not only tend to control bleed, blocking and cockle by reducing the amount of colorant that is deposited on the page essentially all at once, but also help greatly to conceal banding effects. Preferably the several printing passes are overlapping, so that each swath of colorant tends to hide the kinds of banding due to periodic errors in printing-medium advance mechanisms.

For instance, even blank space between the edges of two inaccurately abutting swaths are usually covered by at least some colorant that is well within the boundaries of at least one other swath. Depending on the total number of passes, such blanks may be covered by as many as e.g. three other swaths—in a four-pass printmode—or even more. To put it another way, only one in four drops is missing along such a "blank" pixel row, and the nonuniformity is far less noticeable.

The specific partial-inking pattern employed in each pass, or in all of the passes considered in the aggregate, is called a "printmask". (In some writings the term "printmask" is reserved for only the patterns used in each pass of a repeating set, while different terminology, "shingle mask", is used to refer to the overall pattern of masks for all passes. This document follows the simpler usage of "printmask" for both.) The way in which these different patterns or masks add up to a single fully inked image is the "printmode".

Whereas the image-processing stage establishes spatial assignments of color spots to pixels, the printmasking stage establishes temporal assignments of color spots as among the several printing passes that have access to each pixel. Printmasking is ordinarily downstream from image processing.

Random masking—Although printmode techniques are very powerful, it has been noticed that they fail to fully eliminate the effects of the previously described underlying periodic errors, and in some cases may even contribute to certain kinds of periodic artifacts. Early efforts to deal with these observations focused upon the regular, systematic character of the first generations of printmasks.

It was thought that the tendency of spurious printout patterns to persist or to be accentuated by printmasking was simply due to that regularity within the masks themselves. Because of this, considerable recent attention has been directed to randomization of the printmasking stage.

Some such efforts are reflected in the previously enumerated patent documents relating to randomized masks, randomized printmodes, and location rules. As those documents show, these efforts have been successful in eliminating systematic-appearing patterns within individual mask cells. Although such patterns within each cell have been replaced by irregular, random, wispy shapes, the shapes are ordinarily inoffensive when considered one cell at a time.

The improvement available through randomization, unfortunately, heretofore has been limited because printmasks are effective in hiding dot-placement errors only within the dimensions of the mask. In other words, the irregular, random shapes just mentioned become conspicuous and often unesthetic when repeated dozens of times across the width and down the height of an image.

Therefore a maximal improvement seemed to require that the printmask patterns be reasonably large in comparison with the overall image—for instance, a pattern width equal to one-third or more than one-half of the total image width. More recent work (such as reported, for instance, in the copending applications of Garcia) suggests that the eye is insensitive to printmask size increase beyond roughly two and a half centimeters (one inch).

Even this size range, however, is on the order of hundreds of pixels—and printers that can store and use large printmasks tend to be uncompetitively expensive. Most efforts have accordingly focused upon printmasks no wider than sixteen or thirty-two pixels.

Such widths are typically only a very small fraction of a full image width. Therefore such printmasks heretofore are necessarily replicated across the image—with like considerations for the vertical dimensions leading to a similar replication down the image. The result, as mentioned above, is a repeating pattern (FIG. 1) that is all too easily seen in the midtones.

The illustration was made with an eight-by-eight pixel mask used to print an area fill that has one dot in each of four pixels of a superpixel—i.e., four dots total for each superpixel. This "level four" tone is well within the midtone range extending very roughly from two to twenty-seven single dots in each four pixels.

Artifacts such as those shown in FIG. 1 arise from interaction of repetitive mask usage with pen defects of directionality or inkdrop size. As this example demonstrates, development of new and better printmasks as such is likely to be only a partial solution to banding and other repeating artifacts in the midtones.

Superpixels or dither cells in image processing—In response to these seeming limitations of printmode strategy some very recent effort has focused upon the potentialities for randomization in the earlier, upstream, image-processing stage of the overall printing process. Pixel structures called "superpixels" and related structures called "dither cells", both previously used in the image-processing stages, have been explored as vehicles for introducing randomization to reduce banding.

The results, in terms of banding reduction—taught in the above-mentioned document Ser. No. 09/042,880 of Askeland and Doron—have been favorable. Some degradation of effective or perceived resolution, however, has been found to limit the acceptability of this technique for images that include sharply defined features.

Undercolor removal, or black replacement—One other area of innovations will be helpful as background to an understanding of the present invention. This subsection explains why undercolor and its so-called "equivalent" black are not equivalents colorimetrically, at least for purposes of the present document.

In regard to a chromatic-color image, the industrial term "undercolor" means the portion of each chromatic color (in the image) that is composed of equal parts of primary colors, e.g. red, green and blue. The magnitude of those equal parts, and therefore the magnitude of the undercolor, is equal to the magnitude of the smallest of the three primary constituents which make up each chromatic color.

It is well known that the magnitude of the undercolor is—in purest principle—equivalent to an equal amount of black. Therefore for instance in a printer an approximately equal hue appearance in an image can be obtained by replacing the undercolor with an equal amount of black.

For the sake of accuracy it is important to emphasize here that this theoretical equality is at best true in terms of hue appearance only. In various pragmatic ways the substitution of black for the tricolorant undercolor differs very importantly.

For example, in some circles it is held that the substitution of black ink for the supposedly equivalent aggregate of three colorants, in a real-world image-forming system, actually changes—and in fact degrades—the hue. This thinking is particularly applicable to midtone and heavy-shadow regions. This school of thought—which is creditable, and indeed rather sophisticated as to the more-serious artistic aspects of color reproduction—has it that the tricolorant form of the undercolor is in some way "richer" and therefore has greater esthetic or emotional impact.

Another difference is that in highlight regions the black substitution yields a much more granular appearance, due to the substitution of one dead-black dot for each three chromatically colored dots. As individual ink dots cannot be well resolved visually, their color is not perceptible. Thus scattered individual dots of the three chromatic constituent inks tend simply to appear gray, or in other words less dark than an individual dot of black ink.

Therefore the supposedly equivalent black dots, for the same average grayness, must be scattered more widely. It is this geometrical effect that accounts for the greater granularity. Particularly if the three individual colorants can be well spread about, in highlight regions, they are much better able to suitably render smooth gradations than the corresponding amount of black ink.

On the other hand, still other differences favor the use of black. The chemistry of black ink is different, typically simpler, than that of chromatic inks; thus drying times, interactions between inks, and interactions between ink and various different printing media, all tend to be much more controllable than for three separate chromatics. These factors all exert strong influences upon the overall color appearance of a printed image—or, to use terminology most relevant to this document, upon the colorimetric character of the image.

Furthermore the volume of black ink is roughly one third the total volume of the three chromatic colorants; hence (even setting aside chemical differences) drying time is much shorter for black. For equal throughput, the black ink is therefore less susceptible to coalescence—which in various complicated ways can alter colorimetric properties drastically.

Based upon these several considerations it is well known to substitute black for undercolor where throughput without blocking or coalescence is of dominant importance. (Consideration of economy leads in the same direction, as fewer drops of black are required to obtain roughly equivalent gray-scale results, and even on a drop-for-drop basis black ink is often much less expensive.)

To the contrary it is known to refrain from such substitution—and even to replace black already in an image with its three-ink undercolor "equivalent"—in highlight regions or elsewhere for best esthetic impact. From the discussion in this subsection it should be recognized, at the least, that black and its so-called "equivalent" undercolor are not "colorimetric equivalents".

Conclusion—Repetitive patterns arising from systematic dot-placement errors, even in the presence of internally randomized printmask patterns, have continued to impede achievement of uniformly excellent inkjet printing—at high throughput—on all industrially important printing media. Thus important aspects of the technology used in the field of the invention remain amenable to useful refinement.

SUMMARY OF THE DISCLOSURE

The present invention introduces such refinement. Before offering a relatively rigorous presentation, this section will preliminarily and informally introduce some of the thinking behind the invention. It is to be understood that this informal preamble is not a definition of the invention itself.

(1) Image fidelity—If the two or more such masks corresponded to significantly different tonal levels, or colorimetric levels, then this strategy would disrupt the image—at the very least interfering with good resolution, as noted above for the superpixel method. The present strategy, however, instead provides a plurality of masks that are tonally or colorimetrically equivalent: different masks that would produce essentially the same color, given perfect pens, perfect pen-firing sequences and perfect media.

If in fact the pens and their firing operations were perfect, then there would be no visible pattern artifact to worry about in the first place, since (as mentioned above) such artifacts arise from interaction of repetitive mask usage with pen defects. The pens, firing and media are imperfect. As a matter of physical fact, then, the colorimetrically equivalent masks do not necessarily produce identically the same color, because they invoke different nozzles for production of a nominal color.

What the use of colorimetrically equivalent masks can accomplish—if properly used—is to mix up, or scramble, the usage of the colorimetrically varying outputs produced by the different masks. When properly employed, this pixel-to-pixel mixing tends very strongly to break up the patterning. It does so with a degree of effectiveness that an automatic system can control to some extent by adjustment of the number of different masks used for each tonal level or colorimetric value.

(2) Pattern breakdown—Now, if a choice among colorimetrically equivalent masks were made systematically from pixel to pixel across rows and down columns, the result in many (but not all) systems would be merely a somewhat larger but still repeating pattern. To avoid such a pointless outcome, for many systems preferably the choice for each pixel is made in a substantially independent way, relative to the choices already made for previous pixels or those about to be made for later-processed pixels.

Perhaps ideally the choice for each pixel respectively is made randomly. In practice, however, a truly random choice may be relatively costly, and such masking also might compromise other key objectives of quality printing. The quality of the resulting images is equal or closely comparable if the choice is "randomized" (as will be discussed below) or even is "substantially randomized".

Now with these preliminary thoughts in mind, this discussion will turn to a more-formal presentation.

In its preferred embodiments, the present invention has several aspects or facets that can be used independently, although they are preferably employed together to optimize their benefits.

In preferred embodiments of a first of its facets or aspects, the invention is apparatus for printing desired images on a printing medium. The apparatus does so by construction of the images from individual marks formed in pixel arrays.

The apparatus includes some means for establishing plural selectable colorimetrically equivalent printmasks. For purposes of generality and breadth in discussing the invention, these means will be called the "printmask-establishing means" or more simply the "establishing means".

The apparatus also includes some means for selecting printmasks, from among the plural selectable printmasks, for use in printing. Again for breadth and generality these means will be called the "printmask-selecting means" or simply the "selecting means".

By "colorimetrically equivalent" is not meant "colorimetrically identical", a more stringent criterion. Colorimetrically equivalent masks, for instance, may differ to some extent in their ability to suppress coalescence—particularly on the special media that are particularly favored for printing pictures that look like photographs. (On the other hand, colorimetrically identical masks are colorimetrically equivalent.) As pointed out earlier, "colorimetrically equivalent" also does not encompass undercolor removal or black-to-undercolor replacement.

This document, including the appended claims, also uses the phrase "substantially colorimetrically equivalent"—a slightly looser criterion. For purposes of the present document, it is defined as specifically encompassing a system designer's discretion to deliberately incorporate some quite small variations. Such variations may include modifications in the numbers and locations of the inkdrops fired, as well as their temporal distribution.

Such deliberate variations may arise in two different ways. One may be a competitor's desire to escape from the literal meaning of "colorimetrically equivalent" to avoid the sweep of the appended claims.

The second, and perhaps a more salutary, object may be to superimpose an additional layer of variations upon those achieved by selection among colorimetrically equivalent masks. For instance such variations may be very helpful in avoiding tonal-step quantization artifacts, as will be discussed below in connection with error-diffusion embodiments of the invention.

The foregoing may constitute a description or definition of the first facet of the invention in its broadest or most general form. Even in this general form, however, it can be seen that this aspect of the invention significantly mitigates the difficulties left unresolved in the art.

In particular, this aspect of our invention introduces an entirely new way to suppress and hide banding and other repetitive artifacts. It does so by . . .

Although this aspect of the invention in its broad form thus represents a significant advance in the art, it is preferably practiced in conjunction with certain other features or characteristics that further enhance enjoyment of overall benefits.

For example, it is preferred that the apparatus also include a nonvolatile memory holding program instructions for automatic operation of both the printmask-establishing and -selecting means. It is also preferred that the apparatus include a printing stage for applying the selected printmasks in printing, to control forming of marks on such medium.

Preferably in the latter situation the apparatus also has a printer case, a pen carriage mounted for reciprocating motion in the printer case, and an advance mechanism in the printer case for effecting relative motion of the medium with respect to the pen carriage, along a direction of motion substantially orthogonal to the carriage reciprocating motion. In this case the apparatus additionally includes at least one pen carried on the carriage, in multiple passes across each pixel, for ejecting ink to form the marks on the medium. The printmask-establishing and -selecting means, and the printing stage, considered together, include at least one associated digital processor for controlling and coordinating the carriage, the advance mechanism and the pen or pens.

Still further as to the preference just described, the apparatus also preferably includes an image-processing stage that assigns inking spatially as among pixels; in this instance it is also preferable that each of the established printmasks sets temporal assignments, as among printing passes, of the spatially assigned inking. Another related preference is that the applying means include some means for employing the selected printmasks for successive pixels in a substantially randomized sequence.

The term "randomize" as used in this document is not to be misunderstood as limiting the invention to equipment or a method that is truly random. Such equipment is, on the other hand, within the scope of the word "randomize".

Thus the term "randomize" as will be seen is intended to convey apparatus and method operating on the basis of a sequence that has no sensible or logical-appearing pattern. (Perhaps the ultimate test is a somewhat circular one—namely, whether there is any perceptible or significant pattern artifact in a resulting printed image.)

This definition in turn naturally encompasses sequences having at least major random contributions—but also possibly satisfying certain constraints that disrupt the degree of perfection of the randomness. Another way to say the same thing may be that the apparatus and method are "pseudo-random".

As suggested earlier in this subsection, a systematic selection among colorimetric equivalents, though undesirable in many systems, is acceptable in some systems. In preferred embodiments of some aspects of the invention, a somewhat systematic method of choice can be made to interact with characteristics of the image, to suppress pattern artifacts. For instance, one aspect of the invention for which this is true is error diffusion.

This point is further developed below. As will be seen, in some such cases a degree of randomization may arise in the process.

Still another preference, as to the first main facet or aspect of the invention, is that the establishing means establish printmasks that each occupy a very small fraction of the image width. It is still more highly preferable that the masks each occupy significantly less than six millimeters (one-quarter inch) in both width and height respectively.

Another preference is that the selecting means select the printmasks for successive pixels, from among the established printmasks, by a substantially randomized process.

Yet another preference is that the selecting means define an input image as an array of input colorimetric levels for printing—and selectably map each input colorimetric level to any one of a plurality of colorimetrically equivalent printmasks. In this situation it is even more highly preferable that the apparatus also include some means for establishing a plurality of colorimetrically equivalent tonal levels.

The concept of colorimetric equivalence, as used in this document, has been introduced above. Its application here to tonal levels (as distinct from printmasks) is straightforward.

In this case the selecting means also include some means for assigning each input colorimetric level of the defined input image independently to a particular one of the plurality of colorimetrically equivalent tonal levels. This assigning is done by a substantially randomized procedure.

As a result the selecting means and mapping means cooperate to automatically perform a substantially randomized assignment of each input level of the defined input image to a respective one of the plurality of colorimetrically equivalent printmasks. Thus this preference in essence, among other possible uses, provides a stratagem for using plural colorimetrically equivalent printmasks, and selecting them in a randomized way, but without obtaining direct access to the printmasking stage.

Such direct access is otherwise generally necessary, if one sets out to define equivalent masks and establish a methodology for selecting among them. Therefore this preferred approach is especially useful in situations that preclude such direct access, as for instance when it is desired to incorporate the present invention into a commercial product whose printmasking stage has been frozen with respect to additional engineering changes.

Yet another preference, as to first aspect of the invention, is that the printmask-defining means include some means for preparing the image using a pixel grid that is coarser than the available printer resolution—and also means for constructing the plural colorimetrically equivalent printmasks by varying allocation of printer passes as among pixels of the coarser grid.

As will be seen, colorimetrically equivalent—or substantially equivalent—masks may be provided that:
  (1) subdivide incoming source-image pixels into a finer pixel grid at the printer resolution, and parcel out the source-image pixel data differently into the finer printer-pixel grid (this is the preference described in the preceding paragraph); or
  (2) perform essentially the same processing but simply in a different temporal sequence, or
  (3) both subdivide incoming pixels and create different temporal sequences.

Still other methodologies for creating masks that are colorimetrically equivalent, or substantially so, are within the scope of certain of the appended claims.

In preferred forms of a second of its facets or aspects, our invention is a method for printing desired images on a printing medium, by construction from individual marks formed in pixel arrays. The method includes the step of establishing plural selectable colorimetrically equivalent tonal levels.

In addition the procedure includes the step of selecting tonal levels, from among the plural selectable colorimetrically equivalent tonal levels, for use in printing.

The foregoing may constitute a description or definition of the second facet of the invention in its broadest or most general form. Even in this general form, however, it can be seen that this aspect of the invention, too, significantly mitigates the difficulties left unresolved in the art.

In particular, as mentioned earlier, this establishment of plural colorimetrically equivalent levels offers a way of gaining access to a printmasking stage, indirectly—for example to introduce selections as among plural masks—when it is not possible to gain such access directly. Other beneficial applications of this second main aspect of the invention may occur to those skilled in the art.

Although this second aspect of the invention in its broad form thus represents a significant advance in the art, it is preferably practiced in conjunction with certain other features or characteristics that further enhance enjoyment of overall benefits.

For example, it is preferred that the method also include the step of applying the selected levels in printing, to control forming of marks on the medium. In this latter case it is also preferred that the applying step include operating a printing mechanism such as described earlier—i.e., a pen carriage, a pen or pens, an advance mechanism and a digital processor or processors.

Another preference is that the applying step include employing the selected tonal levels for successive pixels in a substantially randomized sequence. Yet another preference is that the tonal-level selecting step assign inking spatially as among pixels; and that the method also include a printmasking step, following the selecting step, that sets temporal assignments, as among printing passes, of the spatially assigned inking.

Still other preference, as to the second main aspect of the invention, is that the printmasking step include establishing printmasks that each occupy a very small fraction of the image width. Another preference is that the selecting step include selecting tonal levels for successive pixels, from among the plural selectable colorimetrically equivalent levels, by a substantially randomized procedure.

An additional preference is that the selecting step include the substep of defining an image as an array of colorimetric levels for printing. Going along with this preference is another substep, namely mapping the plural selectable colorimetrically equivalent tonal levels to a plurality of colorimetrically equivalent printmasks, respectively.

In preferred embodiments of a third of its basic aspects or facets, the invention is apparatus for printing desired images on a printing medium, by construction from individual marks formed in pixel arrays. The apparatus includes a halftoning stage for establishing a respective tonal level for printing at each pixel in such array.

In addition the apparatus includes some means for establishing plural distinct selectable colorimetrically equivalent levels for use in the halftoning stage. For reasons outlined earlier these means will be called the "level-establishing means" or just the "establishing means".

The apparatus also includes a printmasking stage for employing printmasks to establish temporal assignments of inking as among printing passes. The apparatus also includes some means for selecting tonal levels, from among the plural selectable colorimetrically equivalent levels, for use in the halftoning stage.

The foregoing may represent a definition or description of the third aspect of our invention in its most general or broad form. Even as so couched, it can be seen that the invention in this form importantly advances the art.

In particular, as before the establishment of plural distinct but colorimetrically equivalent levels provides a system designer with a handle that reaches into the later masking stage and can be used to manipulate masking details or other functions of that stage. Nevertheless we prefer to practice the invention with certain other features or characteristics that optimize the benefits of the invention.

In particular one preference is that the halftoning stage be an error-diffusion stage. In this case preferably that stage is a table-based error diffusion system.

In such a system, the level-establishing means include a lookup table that defines, for each input tonal level, a base level and an error value. The establishing means also include some means for defining plural colorimetrically equivalent base levels.

This preference is advantageous in that, besides reaching from the earlier halftoning stage into the later printmasking stage, the system does so by taking advantage of the flexibility usually available through access to the error-diffusion lookup table. Lookup tables are typically reserved out of software and electronics, even when software and electronics are closed to engineering changes. A table is ordinarily kept accessible for the very reason that many reasons for modifying data tabulations tend to arise long after first versions of products are released to market.

In the error-diffusion system under discussion, the table provides access to definition of equivalent printmasks for outputting the image to a printer mechanism. Meanwhile, as before, the upstream plural levels provide a means of defining equivalence of the masks, in a way that cannot be done directly when the error-diffusion algorithm is locked in, for example, an ASIC. Thus part of the strategy operates on the upstream level-establishing stage and the balance operates on and through the lookup table.

Another preference, still with respect to an error-diffusion stage, is that the selecting means assign different colorimetrically equivalent base levels to multiple successive colorimetrically adjacent input tonal levels. In this case it is preferable that the apparatus also include means for mapping each plural selectable equivalent level to a respective likewise-equivalent printmask. Another preference is that the selecting means be substantially randomized.

All of the foregoing operational principles and advantages of the present invention will be more fully appreciated upon consideration of the following detailed description, with reference to the appended drawings, of which:

BRIEF DESCRIPTION OF THE DRAWINGS

FIG. 2 is a group of four tables making up a conventional printmask or "shingle mask", such as might be used to print the specimen of FIG. 1;

FIG. 5 is a group of six tables making up a novel printmask—comparable to that of the conventional mask used for FIG. 2, but instead according to the same preferred embodiment of the present invention such as might be used to print the specimen of FIG. 4;

FIG. 6 is a group of six tables presenting a direct numerical comparison of patterns resulting from the conventional single level-2 printmask table shown in FIG. 2, versus the novel split level-2 printmask tables for the first preferred embodiment in FIG. 5;

FIG. 7 is a group of six tables making up a novel set of split halftone levels according to a second preferred embodiment of the present invention;

FIG. 9 is a portion of a conventional error-diffusion table such as can be used with the FIG. 8 flowchart;

FIG. 10 is a portion of a novel error-diffusion table according to the third preferred embodiment, that also can be used with the FIG. 8 flowchart;

FIG. 11 is a group of eleven tables presenting a direct comparison analogous to FIG. 6, but here for the third preferred embodiment of FIG. 10;

FIG. 19 is a flow chart showing operation of certain preferred embodiments.

DETAILED DESCRIPTION OF THE PREFERRED EMBODIMENTS

1. PLURAL-PASS SYSTEMS

After image-processing steps have established the spatial distribution of dots to be printed, for a particular image, ordinarily the array proceeds to the later printmasking stage for temporal distribution of the same dots among two or more passes. For highest image quality, relatively larger numbers of passes are usually needed and the printmodes are more properly called "multipass".

Classically a different printmask is formulated for each pass, so that each mask is used in just one respective pass (though a mask may be shifted by one or another form of mask "rotation" for reuse in other passes). The printmask for each pass is accordingly a grid containing single-bit binary values that indicate, for that one pass, whether each particular pixel can be printed or not.

Variant multipass systems employ instead a so-called "shingle mask"—which has a pattern that serves a sort of common or hybrid function, operating as both a dither mask (or superpixel) and printmask. Rather than only single-bit binary values in a separate grid for each pass, a shingle-mask grid contains numbers indicating the pass in which each pixel is printed.

The present invention works well with either of these arrangements—binary-grid or shingle masks. Either may be randomized, and the invention is particularly advantageous with plural-pass systems in which the printmask or masks have been randomized.

This is so because a randomized mask introduces an element of irregular patterning into the temporal distributions. The random selection of masks, and the internal randomization of each mask, then cooperate to provide a double disruption of artifacts that arise from repetitive dot-placement error.

When a particular nozzle happens to be producing a dot-placement error, but a given dot in a given pixel is formed sometimes with that particular nozzle and sometimes with a different nozzle, the error is less repetitive. The visible artifact is therefore less conspicuous and may be eliminated.

2. SPLITTING TO COLORIMETRIC EQUIVALENTS, AND RANDOMIZING

In conventional printmasking, i.e. with conventional shingle masks, each individual mask corresponds to a specific halftone level. FIG. 2, for example shows a standard mask set, or shingle mask, for four-level printing—using a 48 by 24 dot per millimeter (1200 by 600 dot per inch) printing system.

The data are received at 24 by 24 dots per millimeter, but are printed on the 48 by 24 grid—the printer resolution. The number in each grid location of the illustration represents the pass in which a drop is printed in that location.

Figure 1:
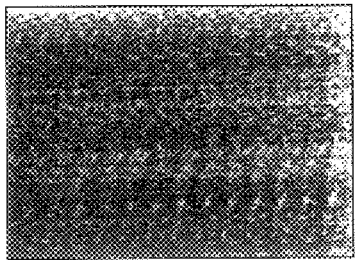
FIG. 1 is a black-and-white photomicrograph of a color square printed using an eight-by-eight pixel randomized print mask, but showing repetitive patterning.
Figure 3:
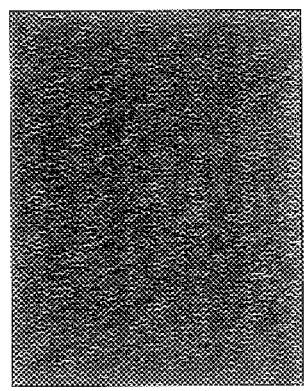
FIG. 3 is a printout made using a print simulator with a conventional mask pattern such as that of FIG. 2, and reduced to roughly one-quarter of original size.

Resulting printouts in general contain repeating patterns as shown in FIG. 1 and also in FIG. 3; in these two views the FIG. 3 patterns appear more subtle, but can be seen in particular repeating along the vertical direction. The pattern that is repeated is the width and height of the shingle mask.

Figure 4:
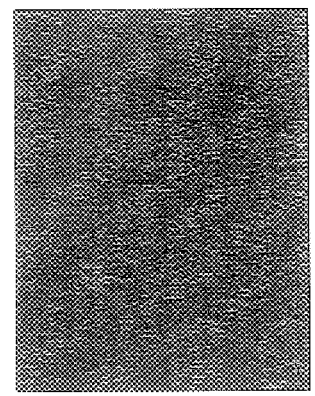
FIG. 4 is a like printout but made with a novel mask pattern according to a first preferred embodiment of the present invention.
Figure 15:
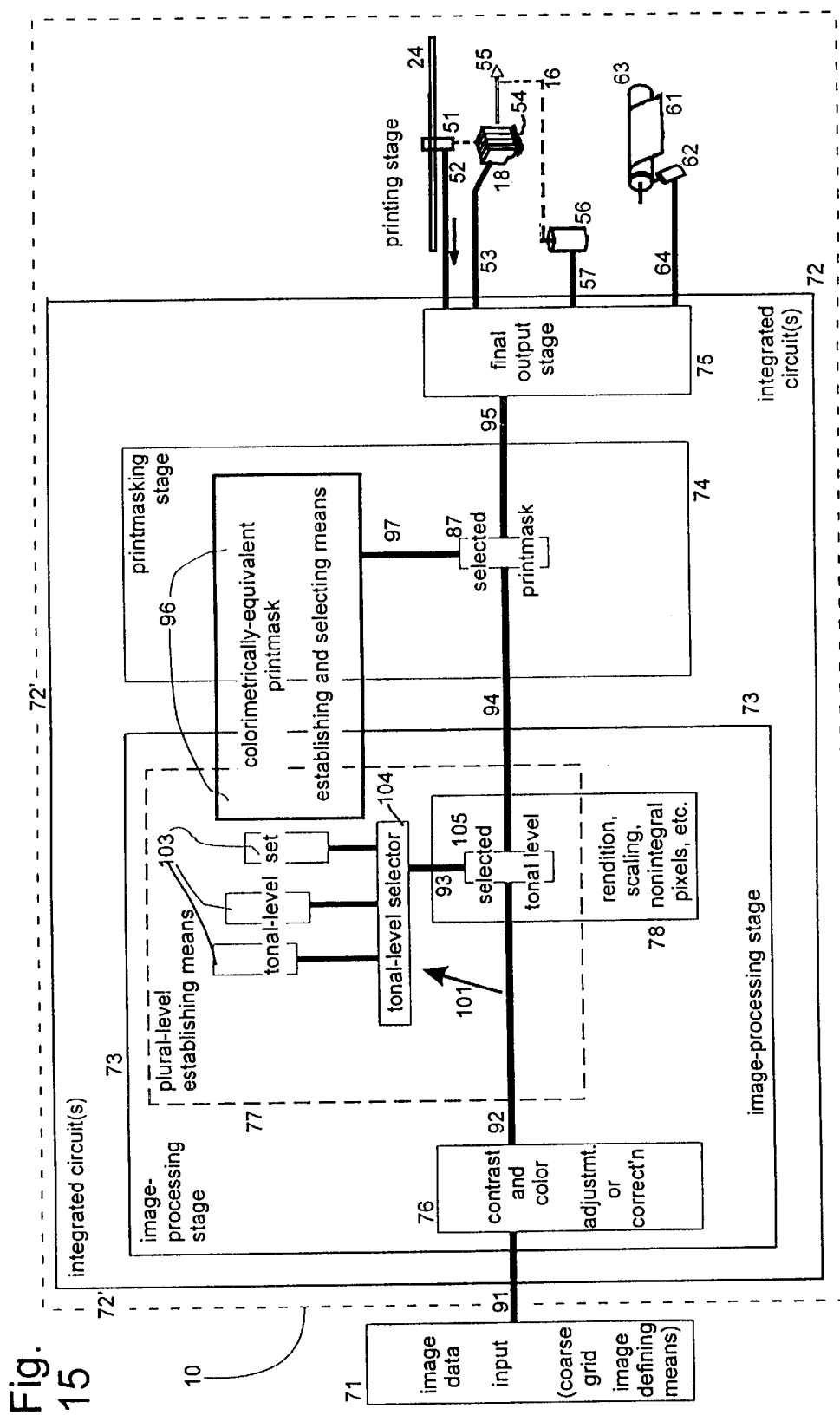
FIG. 15 is a highly schematic block-diagrammatic representation of preferred embodiments of the invention, somewhat generalized.

What is desired, and what can be accomplished through use of the invention, is shown in FIG. 4—where wispy, irregular patterns can still be found, but they do not repeat. The principle behind this improvement appears in FIG. 15, which shows that the establishment and selection 96 of colorimetrically equivalent printmasks can be localized either within an image-processing stage 73 or within a printmasking stage 74—or partly within each.

The context of such "establishing means" and "selecting means" commonly includes an image data source 71 feeding 91 a self-contained system in a printer case 72', although often the data-processing circuitry 72 is partly provided in an associated computer or raster image processor. Within the programmed image-processing circuits, contrast and color adjustments or corrections 76 are ordinarily made at the outset.

Adjusted or corrected data 92 then proceed to a rendition and scaling substage 78. Part of this module, even in a conventional system, includes some means 77 for establishing multiple tonal levels 103 and selecting 104 among them—though conceptually these functions are not ordinarily regarded as separate steps. Rather they are most commonly taken for granted, as associated with the presence of multiple levels in the incoming data 71, 91.

As a prelude to introduction of details of the present invention, however, the establishing and selecting functions 77 may be helpfully perceived as a discrete task. Naturally the selecting portion is a function that, in some way, must be driven 101 by the contents 92 of the data stream, so that the selected level 105 is appropriate to the incoming data bytes 92.

In a conventional system, the several levels 103 are respectively unique. In the prior art there is no point in defining more than one tonal level 103 for a given color appearance. Even some embodiments of the present invention, as will be seen, do not define plural tonal levels 103 for a single color specification.

Data 94 leaving the rendition stage next enter a printmasking stage 74, which selects a printmask that must be appropriate to the selected tonal level 105. In the prior art, again, each selected mask 87 is unique; there is no point in defining more than one mask 87 for a given color appearance.

According to the present invention, however, there are at least two masks defined for each tonal level—at least in the midrange. From among these plural defined masks, one mask 87 is selected for use in printing the color in each pixel of the rendered data 94. As noted above, the establishing and selecting of plural masks is a basic function 96 in the present invention.

After application of a selected mask the data 95 proceed to a final output stage 75 for translation to the electronic signals 53, 57, 64 necessary for driving the pens 18, scan motor 56 and printing-medium advance motor 62. Ink 54 is thereby ejected onto the print medium 61 while the platen 63 moves the medium, to form images on the medium. A sensor 51 reads a position encoder strip 24 to send pulses 52 back to the control stage 75, to enable the latter to take into account the pen position and velocity as well.

The examples in this document illustrate two-pass printmodes for ease of explanation. The invention, however, applies to any multipass printmode and are even more effective when used with a higher number of passes.

The examples also are limited to two sublevels, and two related masks, for each level or mask that is to be split. Again, the invention contemplates greater numbers of masks as well—three or four sublevels and submasks, for instance, to obtain even more complete disruption of patterning.

As mentioned in the earlier Summary of the Disclosure section, the invention can operate either with different passes but a common processing and printing resolution, or with subdivided incoming pixels as illustrated.

Through use of the invention, banding or patterning is reduced without degrading resolution or interfering with halftoning. This is particularly important on special media, where dot-placement artifacts have a significant effect on banding.

The use of plural colorimetric equivalent masks is far less expensive than the use of large masks.

3. SPLITTING AND RANDOMIZING AT THE MASKING STAGE

Now in the most straightforward form of the invention the establishing of multiple printmasks is performed within the printmasking stage. It is done in a submodule 232 which actually provides more than one printmask—for example, a pair 228 of masks—for at least one of the tonal levels 208 within the full set 203 of levels in the image-processing stage.

This correspondence 231 is very important to proper functioning of the invention. Both, or all three or more, of the masks 228 provided for a single tonal level 208 must produce substantially the same color effect (at least on the average), or naturally the image is simply wrong.

In the first instance, therefore, the selection of a mask is driven 221 by the data 94: the mask must go with the data point. Once past that point, however, the system must also confront the presence of more than one mask that goes with the data point.

Thus, rather than defining just one shingle mask for each level the present invention defines two or more different shingle masks 228 for each level 208 that poses a patterning problem. As mentioned earlier these primarily are levels in the midrange, and usually highlights and shadows need not be so treated.

In addition, the system includes the capability for selection 97 between the two masks directly, as illustrated. By "directly" is meant that the system must be programmed to deal explicitly and specifically with the facts that (1) there are two masks for one level and (2) it is necessary to decide which mask to use.

Preferably for purposes of this direct approach the decision is made in a randomized way, as suggested by the random-number generator 222 in the drawing. As previously explained, however, a purely and truly random decision is not necessary.

As the plural masks preferably are colorimetrically equivalent, it does not matter to output color (again, assuming perfect components) which mask is chosen at any given pixel. An example appears as FIG. 5, where there are two versions of mask 1—i.e., the mask(s) for level 1—and also two versions of mask 2, corresponding analogously to level 2.

Now it is possible to randomly select one mask from among the two or more equivalent ones, for each input (24 by 24) pixel. By such random selection between mask 2A and 2B, it is possible to randomly change both:

(1) which nozzle is used to print a given 48 by 24 dot per millimeter pixel (pass 1 versus pass 2), and (2) the 24 by 24 subpixel location (either the first or the second 48 by 24 dot per millimeter pixel).

Figure 6:
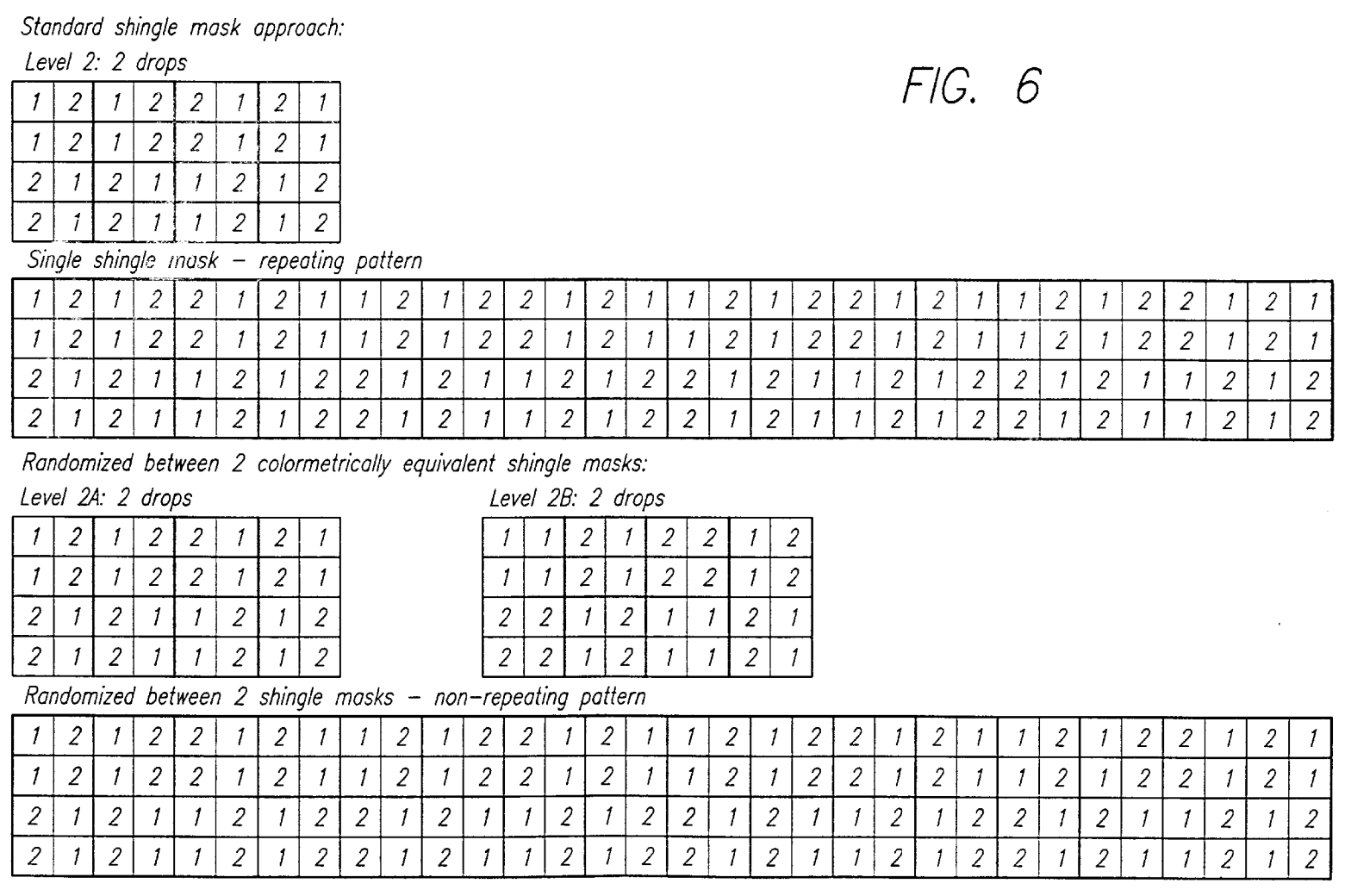

FIG. 4 compares the shingle-mask pattern actually stamped out across the page, for the conventional approach as compared with randomizing between two equivalent masks. The repeating patterns that give rise to problems (such as shown in FIGS. 1 and 2) are clearly visible in FIG. 6 for the upper table, for the standard approach, but no such patterns appear in the lower table for the randomized approach.

A simulation was conducted with a software simulator known as a virtual printer. The simulation used scan-axis directionality errors (i.e., nozzles firing too far to left or right), with a uniform field of one drop per pixel in the coarse grid.

This simulation was the source of FIGS. 2 and 3 in this document. Those illustrations show, more graphically than FIG. 6, the reduction of banding that occurs when shinglemask patterns are broken up through use of the invention.

Due to limitations of the virtual printer now in use, this simulation only changed the temporal aspects of the shingle mask; randomization between 24 by 24 subgrid locations is not possible with this testbed. It will be appreciated that incorporating randomization too can produce an even better output.

4. SPLITTING AND RANDOMIZING AT THE HALFTONING STAGE

An alternative method that produces the same result is to create redundant, or colorimetrically equivalent, halftone levels—which map to colorimetrically equivalent shingle masks. FIG. 7 shows a six-level system, in which the original halftone level 1 is divided into two new halftone levels (1 and 2) on a pixel-by-pixel basis (24 by 24 coarse grid); and original level 2 is likewise divided.

Both new halftone levels 1 and 2 map to one-drop shingle masks, and the new levels 3 and 4 both map to two-drop shingle masks. Now, each incoming pixel in the coarse grid—if it is in either of the two incoming levels that are split by the system—is randomly assigned to one or the other of the two sublevels for the level of that incoming pixel.

Figure 17:
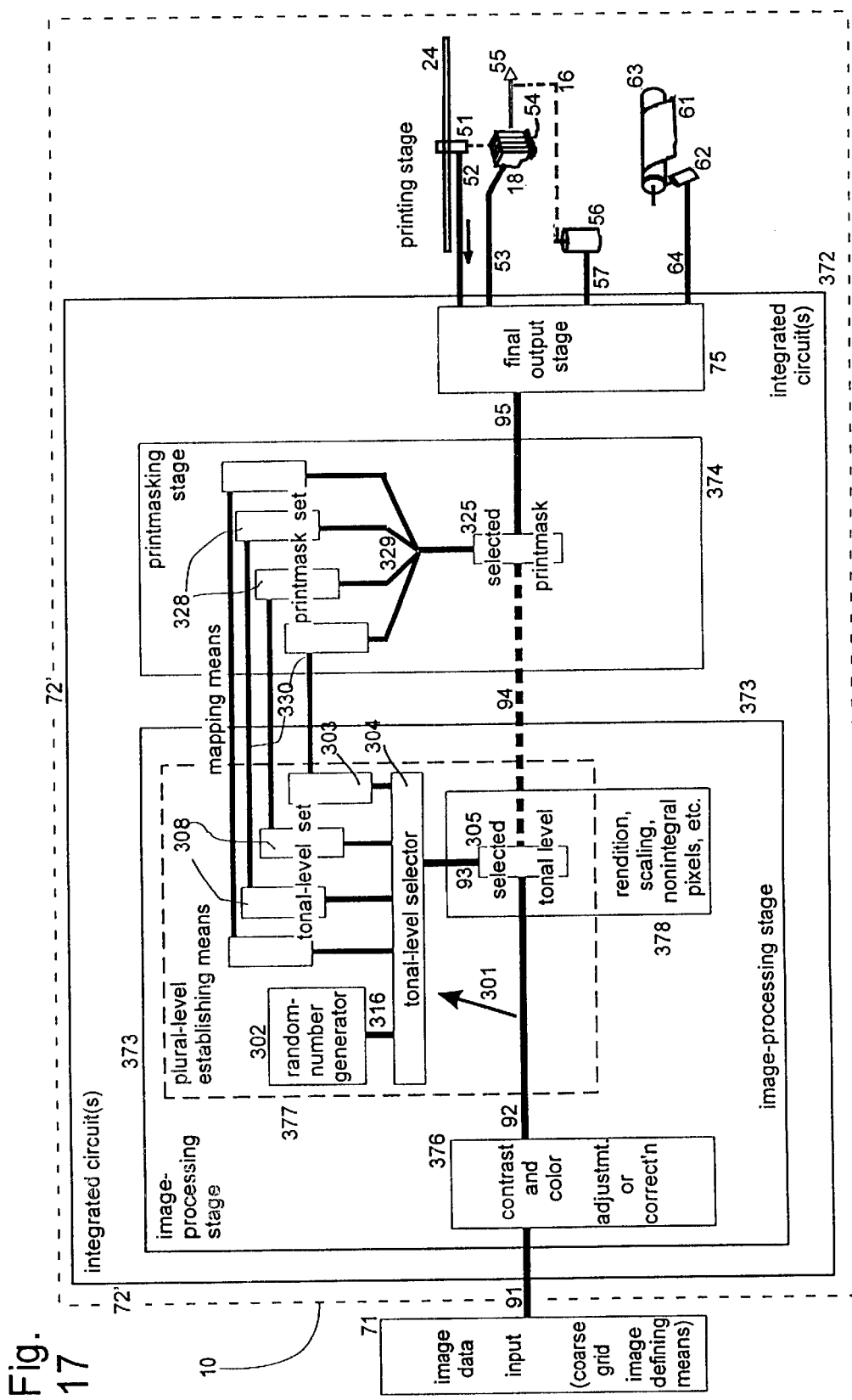
FIG. 17 is a like representation but related to selection that is effectuated by mapping of printmasks from plural colorimetrically equivalent tonal levels.

The principle here is illustrated in FIG. 17, where it is necessary to recognize that the principal data path 94 actually is not the main channel for selection of mask units. Rather that function is actually embedded in mapping 330 between plural colorimetrically equivalent tonal levels 308, developed early-on in the image-processing stage 373, and corresponding masks 328 in the printmask stage 374.

Figure 16:
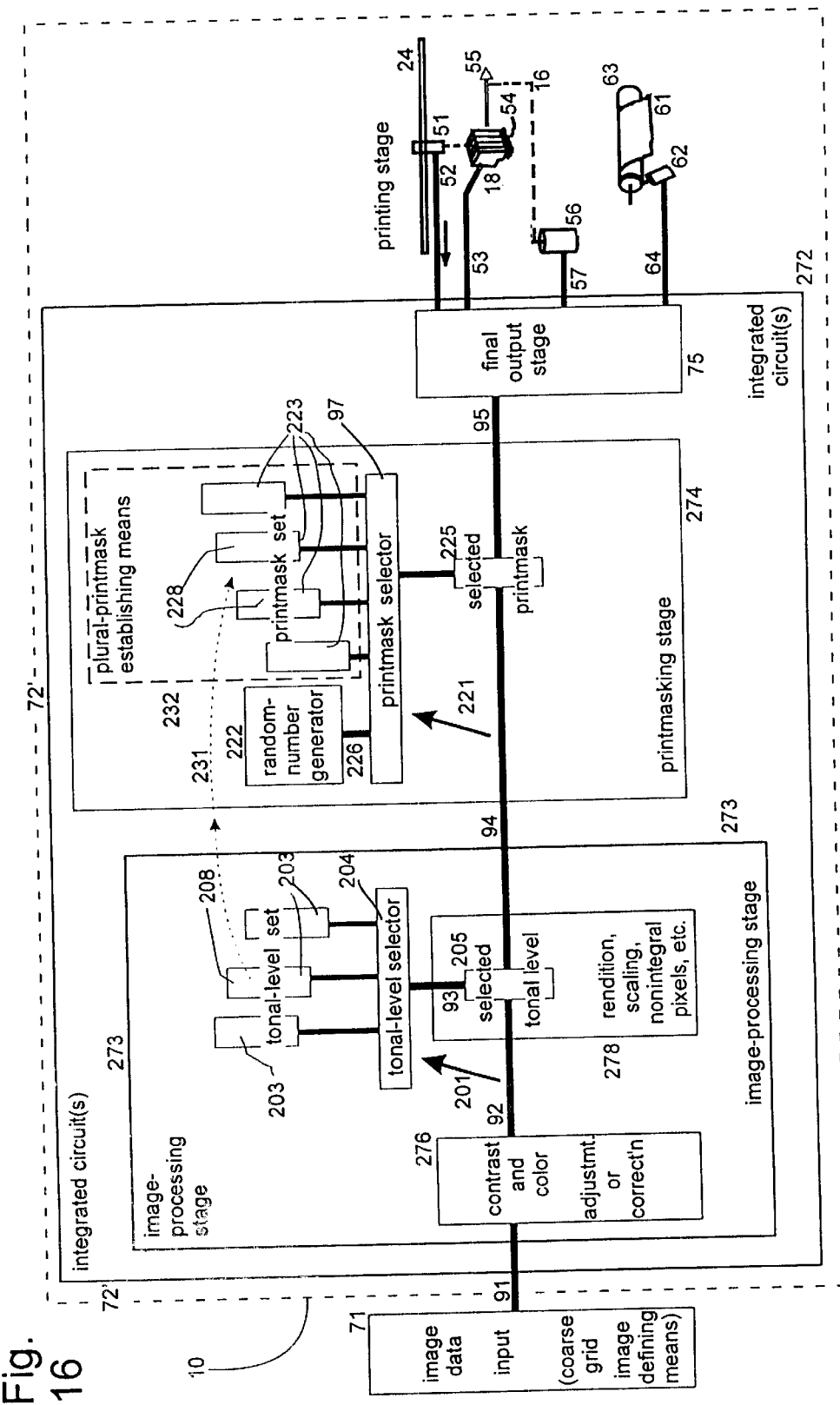
FIG. 16 is a like representation of the FIG. 15 preferred embodiments but more particularly related to direct selection among plural colorimetrically equivalent printmasks.

Once one of the equivalent levels is chosen, by that act its slave mask 328 too is chosen. The selected printmask 325 is simply an appropriate mask, funneled 329 from the mask sets 328. The seemingly implicit character of the association 231 (FIG. 16) between tone and mask has now grown into a more-dominant role.

5. SPLITTING IN A TABLE-BASED ERROR-DIFFUSION STAGE

In a high-performance-architecture system, table-based fast error diffusion is performed in a printer ASIC. As is well known, modifications to existing ASIC modules are extremely expensive and entail great risk to engineering schedules.

To avoid such drawbacks but achieve the benefits of the invention in such a system, it is possible to take advantage of the reengineering accessibility of the error-diffusion table—though not the ASIC. This approach is analogous to that in subsection 4 just above.

Figure 8:
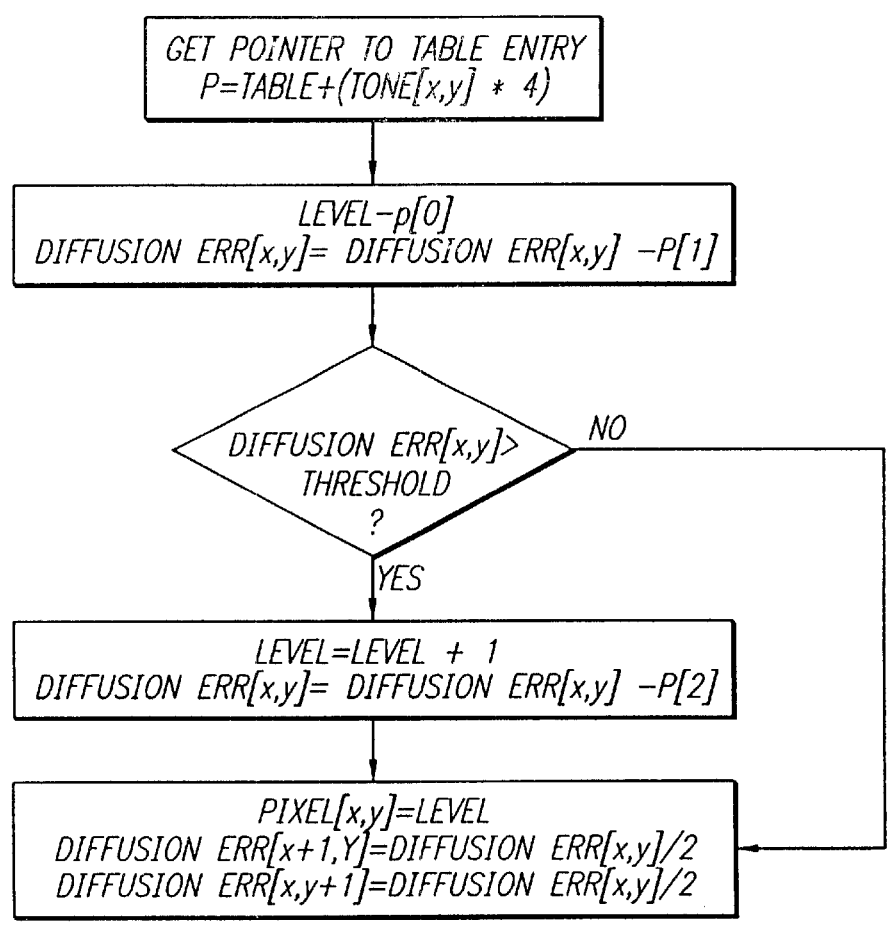
FIG. 8 is a flowchart of a portion of a table-based error-diffusion algorithm such as can be used with a third preferred embodiment of the present invention.

Instead of randomly choosing one of two equivalent halftone levels for each of the coarse-grid pixels, equivalent halftone levels are defined and used in the error-diffusion table. FIG. 8 shows a pertinent portion of an error-diffusion algorithm employed in adapting the present invention to table-based error diffusion, and will be self explanatory to those skilled in the art of programming for error diffusion with a lookup table.

FIGS. 9 and 10 show a portion of an error-diffusion table (tone levels 120 through 137) for processing conventionally and according to the present invention, respectively. The tables in the example are constructed with base output-level thresholds of 128 and 224.

In other words, tones zero through 127 have a base level of zero, tones 128 through 223 have a base level of one, and the remaining tones 224 through 255 have a base level of 2. The four output levels of the table (0, 1, 2 or 3) correspond to four shingle masks (0, 1, 2 or 3).

The novel table form in FIG. 10 includes colorimetrically equivalent output levels. For tone levels between 128 and 223, the even-numbered tone levels map to base output level 1, whereas the odd-numbered levels map to base output level 3.

The assignment of tonal levels to base output levels need not be randomized, but rather is entirely systematic as shown in FIG. 10. Nevertheless the operation of the error-diffusion system itself interacts with this nonrandomized tabular structure to disrupt patterning in almost all cases.

Exceptions may arise in very large fields of uniform color, particularly a pure primary or secondary. In such cases the system can be programmed to introduce a random variation also.

Output levels 1 and 3 correspond to colorimetrically equivalent shingle masks, each having one drop per pixel. Similarly, even-numbered tone levels between 224 and 255 map to base output level 4, but odd-numbered levels map instead to level 6. Output levels 4 and 6 correspond to colorimetrically equivalent shingle masks of two drops per pixel. Output levels 5 and 7 map to colorimetrically equivalent masks with four drops per pixel.

The modified error-diffusion table is organized so that base output levels increment to output levels thus:

| base output level | increments to output level |
| --- | --- |
| 0 | 1 |
| 1 | 2 |
| 3 | 4 |
| 4 | 5 |
| 6 | 7 |

Here is a comparison of the standard error-diffusion table and a modified table:

| standard error-diffusion table | | modified error-diffusion table | |
| --- | --- | --- | --- |
| output level | drops/pixel in mask | output level | drops/pixel in mask |
| 0 | 0 | 0 | 0 |
| 1 | 1 | 1 | 1 |
| 2 | 2 | 3 | 1 |
| 3 | 4 | 2 | 2 |
| | | 4 | 2 |
| | | 6 | 2 |
| | | 5 | 4 |
| | | 7 | 4 |

FIG. 11 shows the shingle masks for a four-pass printmode using the modified error-diffusion table. Banding is reduced because the shingle mask keeps changing across the page. The one- and four-drop-per-pixel levels are each randomized between two colorimetrically equivalent shingle masks, and the two-drop level is randomized among three colorimetrically equivalent shingle masks.

Figure 18:
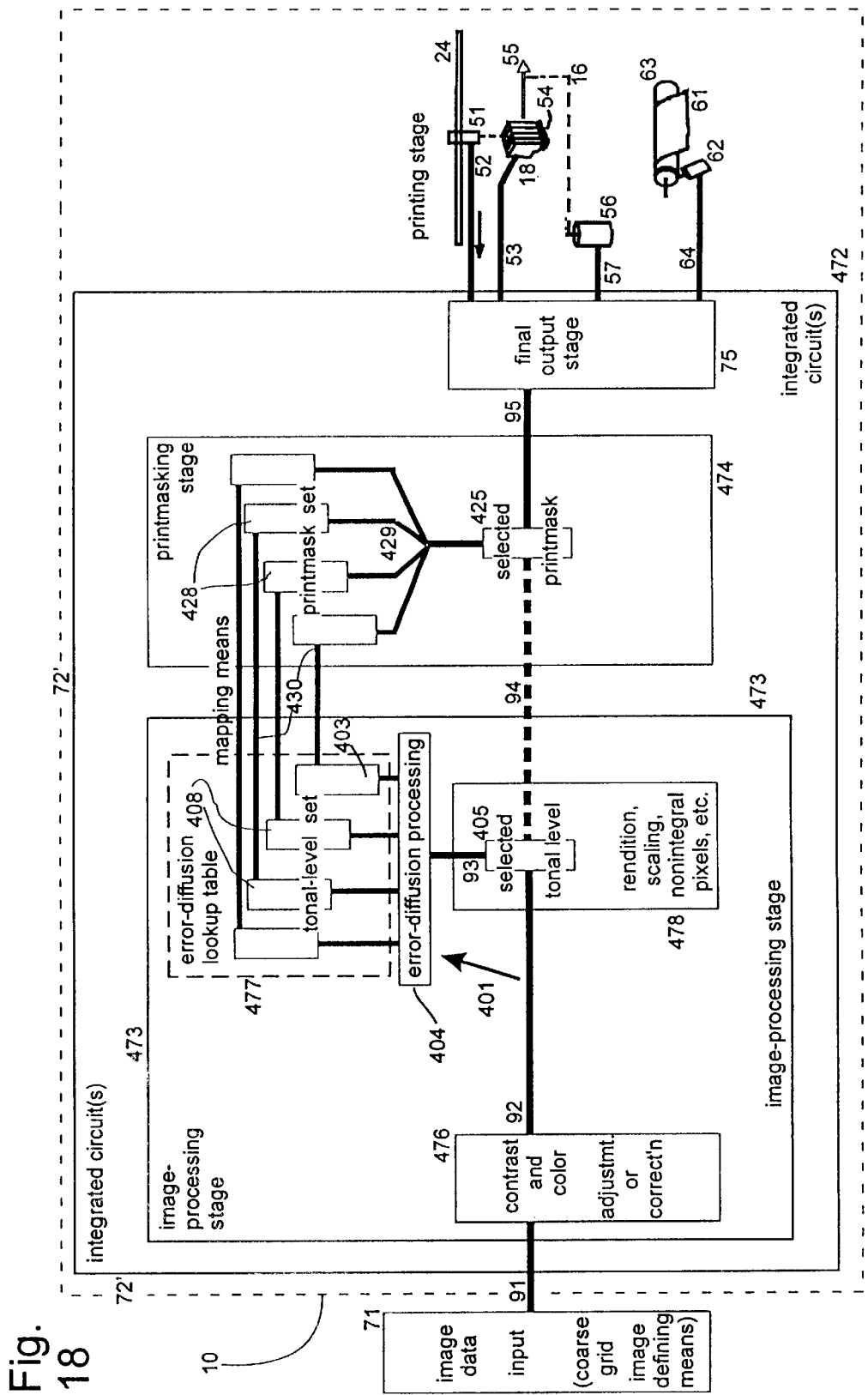
FIG. 18 is a like representation but related to selection that is effectuated by mapping of printmasks from plural colorimetrically equivalent entries in an error-diffusion lookup table.

The operative principle here is shown in FIG. 18, which will be recognized as very much like the previously discussed system of FIG. 17. A principal difference is that the mapping 430 is now from the lookup table 477 to mask set 428.

A point of major importance is that the error-diffusion processing block 404 need not be disturbed. Some changes in the mask sets 428 are required, as indicated in the above paragraphs, and the lookup table 477 is importantly different.

6. RANDOMIZATION

Our invention relies upon randomization techniques that may be conventional, or that may be introduced in the future. These techniques may include, for example, operating a conventional random-number generator in real time during use of the product in the field.

The conventional random-number generator can be of a numerical-series, formulaic type such as described in the technical literature, or for instance may be based upon operation of an asynchronous clock. Such a digital clock may be read directly, or randomization may be based upon intervals established by the clock.

Preferably, however, such a generator instead of operating in real time may be operated in the process of product development. A resulting series of random numbers may be memorized for recall during use of the product in the field.

We have found it satisfactory to give equal probabilistic weights to each of the several printmasks in a set, and it appears that this strategy should yield maximum variation in appearance. It is within the scope of our invention, however, to assign unequal probabilities to the different printmasks— whether or not doing so is more effective in reducing artifacts of certain types or under certain circumstances.

7. HARDWARE FOR IMPLEMENTING THE INVENTION

Figure 12:
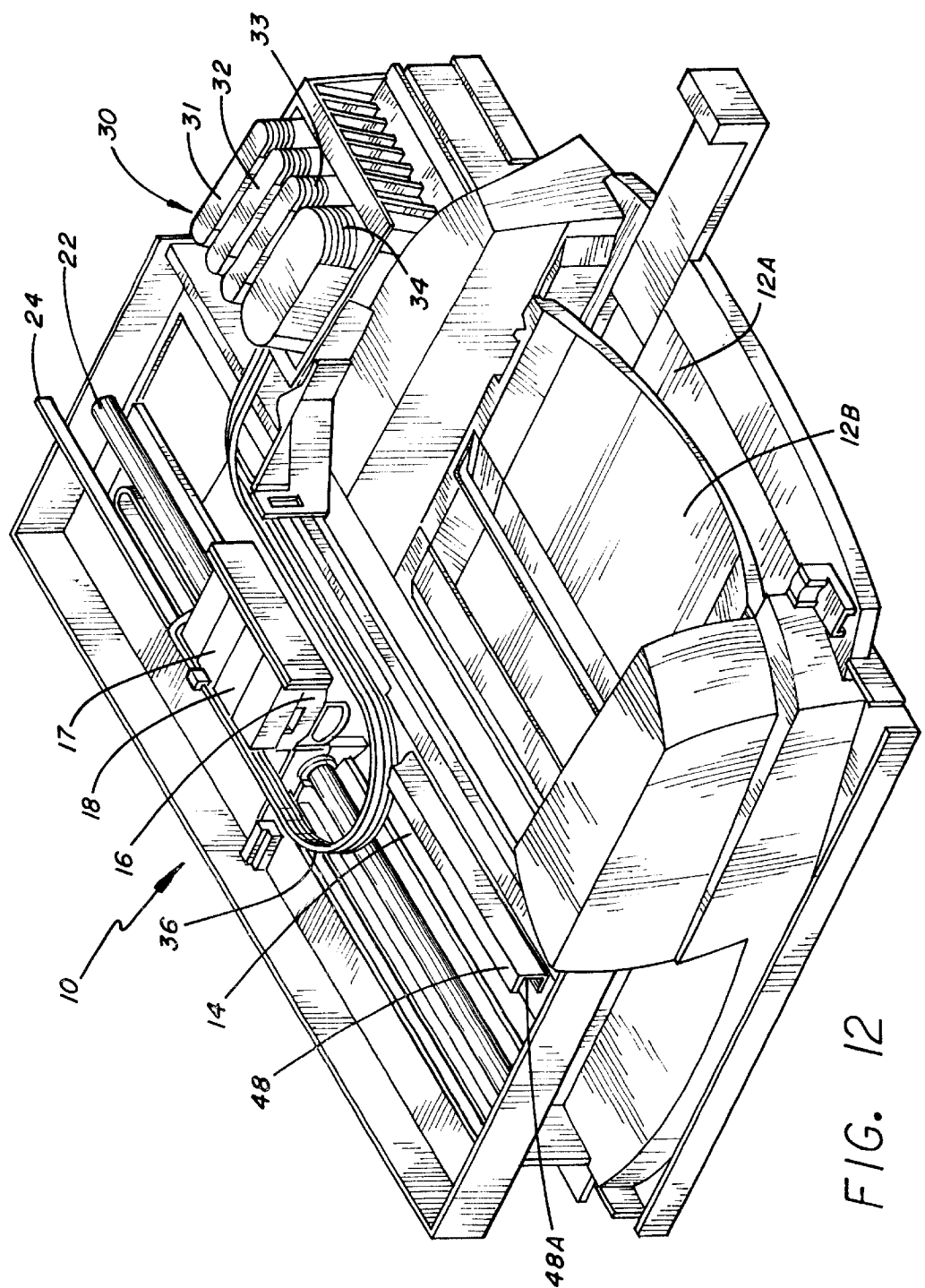
FIG. 12 is an isometric view of a printer in which preferred embodiments of the invention operate—the printer cover being removed to show interior features.

Our invention is advantageously incorporated into the operation of an inkjet printer 10 (FIG. 12). The printer may be one which uses inkjet printheads having integral ink reservoirs that are carried with the printheads along a carriage-scan axis, or as shown may instead be an "off axis" type—meaning that ink is instead in a stationary external supply 30.

Generally the printer includes a tray 12A for holding a supply of fresh paper or other printing medium. To begin the printing process, a sheet feeder—modernly a conventional stepper motor and feed rollers, but for broad conceptual purposes symbolized by a classical cylindrical platen 63—advances a sheet 61 of printing medium from the tray into the printer proper. Here the print medium traverses a U-shaped path to travel in the opposite direction—i.e., toward the output tray 12B.

Along the way the sheet stops with a particular portion of the sheet in a printzone 14. While the sheet is in that position, a scanning carriage 16 (in the conceptual drawing represented by a dashed line) carries 55 one or more printheads 18 across the sheet—ejecting ink-drops 54 to print a swath of ink spots on the sheet.

Preferably the printer actually employs a planar rather than a cylindrical platen at the printzone 14 for supporting the print medium very precisely but also economically. In any event a stepping motor 62, controlled by electronic drive signals 64, advances the print medium.

After a single scan or multiple scans, the sheet 16 is then incrementally shifted to a next position, with another portion of the sheet in the printzone 14. The carriage 16 again scans 55 across the sheet for printing another swath of ink.

These operations iterate until printing is complete, whereupon the sheet is forwarded to a position above tray 12B. This freshly printed sheet is held in that position for a time, to allow for drying of any previously ejected sheet already in the tray 12B, and then released.

The carriage 16 scanning mechanism may be conventional and generally includes a sliderod 22, along which the carriage 16 slides. The mechanism also includes a flexible circuit (not shown) for transmitting electrical signals from the microprocessor in the printer to the carriage 16 and printheads 18.

A photodetector 51 in the carriage 16 optically detects a codestrip 24 to develop position and speed signals 52 for use in precisely positioning the carriage 16 and servocontrolling its scan velocity. Electronic drive signals 57 operate a stepper motor 56, connected to the carriage 16 using a conventional drive belt and pulleys, to drive the carriage 16 across the printzone 14.

An ink delivery system provides ink to the printheads 18, and ultimately to the ink ejection chambers in the printheads, from an off-axis ink supply station 30. The station contains replaceable cartridges 31–34, which contain ink—either pressurized or at atmospheric pressure.

Color printers typically include separate replaceable ink supply cartridges 31–34 for black, yellow, magenta and cyan ink respectively. An ink supply station 30 holds these "off axis" cartridges, and four tubes 36 carry ink from the respective cartridges 31–34 to their corresponding printheads 18.

Figure 13:
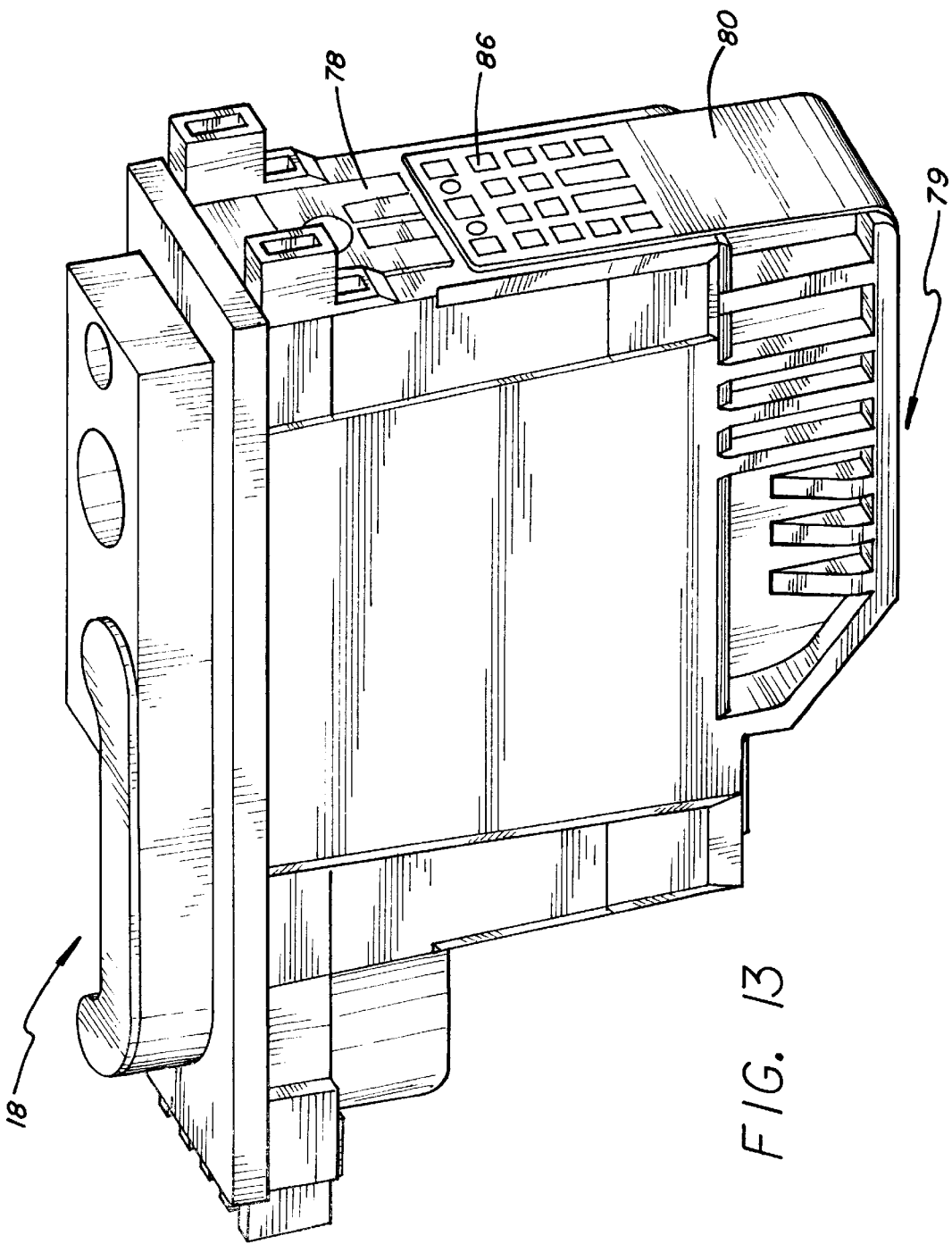
FIG. 13 is a like view, taken from left-front and above, of an inkjet printhead for use in the same printer.
Figure 14:
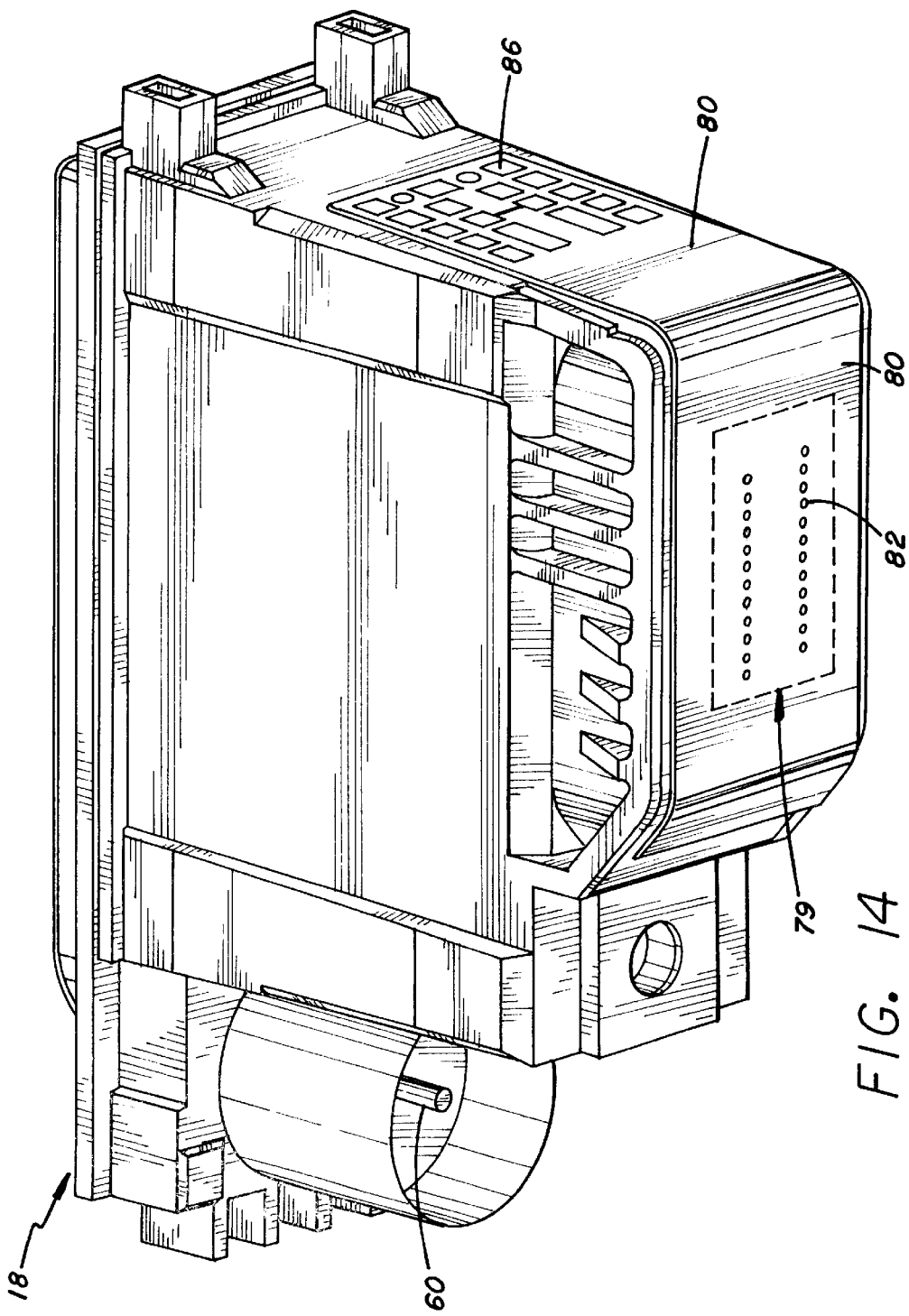
FIG. 14 is a like view of the same printhead taken from left-front and below.

Secured to each of the four printheads 18 is a flexible tape 80 (FIGS. 13 and 14), containing contact pads 86 that lead to respective electrodes (not shown) on the printhead substrate 88. The contact pads 86 align with and electrically contact electrodes (not shown) on the carriage 16.

An integrated-circuit chip or memory element 78 on each printhead 18 provides feedback to the printer regarding certain parameters such as nozzle trajectories and drop volumes of that particular printhead 18. Defined through the tape 80 by laser ablation is a nozzle array or nozzle member 79, consisting of two rows of nozzles 82.

Ink from an ink chamber (not shown) passes through an ink fill hole 81 to initially fill an ink chamber in each printhead 18. After that initial filling a stopper (not shown) permanently seals the hole 81.

Within each printhead 18, a regulator valve (not shown) stabilizes pressure by opening and closing an inlet orifice to the internal ink chamber. When the regulator valve is open, a hollow needle 60 provides fluid communication between the internal chamber and the corresponding one of the off-axis ink cartridges 31–34. During operation in the printer 10, the heads 18 are thus connected with the supply cartridges 31–34 for ink replenishment.

According to our invention, the rendition portion 78 of the image-processing stage can be pressed into service for another function—namely artifact reduction. In essence a portion of the rendition module 78 is absorbed into an artifact-reducing block 77.

This block 77 optionally (as discussed earlier) includes means 81 for introducing randomness into operation of the rendition module 78. The point is to remove dot-placement errors inherent in operation of the mechanical and fluidic elements 24–64 of the printing stage.

Operation of our invention can also be conceptualized in system-flow terms as shown in FIG. 19. In view of the foregoing explanations, this flow chart will be self explanatory to those skilled in the art.

The above disclosure is intended as merely exemplary, and not to limit the scope of the invention—which is to be determined by reference to the appended claims.

What is claimed is:

1. Apparatus for printing desired images on a printing medium, by construction from individual marks formed in pixel arrays; said apparatus comprising:

means for establishing plural selectable colorimetrically equivalent printmasks; and means for selecting printmasks, from among said plural selectable printmasks, for use in printing.

2. The apparatus of claim 1, further comprising:

nonvolatile memory holding instructions for automatic operation of both said means.

3. The apparatus of claim 1, further comprising:

a printing stage for applying the selected printmasks in printing, to control forming of marks on such medium.

4. The apparatus of claim 3, further comprising:

a printer case;

a pen carriage mounted for reciprocating motion in the printer case;

an advance mechanism in the printer case for effecting relative motion of such medium with respect to the pen carriage, along a direction of motion substantially orthogonal to the carriage reciprocating motion; and at least one pen carried on the carriage, in multiple passes across each pixel, for ejecting ink to form the marks on such medium; and wherein the printmask-establishing and printmask-selecting means, and the printing stage, considered together, comprise at least one associated digital processor for controlling and coordinating the carriage, the advance mechanism and the at least one pen.

5. The apparatus of claim 4:

further comprising an image-processing stage that assigns inking spatially as among pixels; and wherein each of the established printmasks sets temporal assignments, as among printing passes, of the spatially assigned inking.

6. The apparatus of claim 3, wherein:

the selecting means comprise means for causing the printing stage to apply the selected printmasks for successive pixels in a substantially randomized sequence.

7. The apparatus of claim 6, wherein:

the establishing means comprise means for establishing printmasks that each occupy a very small fraction of the image width.

8. The apparatus of claim 6, wherein:

the establishing means comprise means for establishing printmasks that each occupy significantly less than six millimeters (one-quarter inch) in both width and height respectively.

9. The apparatus of claim 1, wherein:

the selecting means comprise means for selecting the printmasks for successive pixels, from among the established printmasks, by a substantially randomized process.

10. The apparatus of claim 1, wherein the selecting means comprise:

means for defining an input image as an array of input colorimetric levels for printing; and means for selectably mapping each input colorimetric level to any one of a plurality of colorimetrically equivalent printmasks.

11. The apparatus of claim 10, further comprising:

means for establishing a plurality of colorimetrically equivalent tonal levels;

wherein the selecting means further comprise means for assigning, by a substantially randomized procedure, each input colorimetric level of the defined input image independently to a particular one of the plurality of colorimetrically equivalent tonal levels;

whereby the selecting means and mapping means cooperate to automatically assign each input colorimetric level of the defined input image to a respective one of the plurality of colorimetrically equivalent printmasks.

12. The apparatus of claim 1, further comprising:

means for preparing the image using a pixel grid that is coarser than the available printer resolution; and means for defining said plural colorimetrically equivalent printmasks by varying allocation of printer passes as among pixels at the printer resolution.

13. A method for printing desired images on a printing medium, by construction from individual marks formed in pixel arrays; said method comprising the steps of:

establishing plural selectable colorimetrically equivalent tonal levels; and selecting tonal levels, from among said plural selectable colorimetrically equivalent tonal levels, for use in printing.

14. The method of claim 13, further comprising the step of:

applying the selected levels in printing, to control forming of marks on the medium.

15. The method of claim 14, wherein the applying step comprises:

operating a pen carriage in reciprocating motion over the medium while ejecting ink from at least one pen carried on the carriage, in multiple passes across each pixel, for ejecting ink to form the marks on the medium;

intermittently operating an advance mechanism to effect relative motion of the medium with respect to the pen carriage motion, along a direction of motion substantially orthogonal to the carriage reciprocating motion; and operating at least one associated digital processor for controlling and coordinating all the foregoing steps.

16. The method of claim 14, wherein:

the applying step comprises employing the selected tonal levels for successive pixels in a substantially randomized sequence.

17. The method of claim 14:

wherein the tonal-level selecting step assigns inking spatially as among pixels; and further comprising a printmasking step, following the selecting step, that sets temporal assignments, as among printing passes, of the spatially assigned inking.

18. The method of claim 17, wherein:

the printmasking step comprises establishing printmasks that each occupy a very small fraction of the image width.

19. The method of claim 13, wherein:

the selecting step comprises selecting tonal levels for successive pixels, from among said plural selectable colorimetrically equivalent levels, by a substantially randomized procedure.

20. The method of claim 13, wherein the selecting step comprises the substeps of:

defining an image as an array of colorimetric levels for printing; and mapping the plural selectable colorimetrically equivalent tonal levels to a plurality of colorimetrically equivalent printmasks, respectively.

21. Apparatus for printing desired images on a printing medium, by construction from individual marks formed in pixel arrays; said apparatus comprising:

a halftoning stage for establishing a respective tonal level for printing at each pixel in such array;

means for establishing plural distinct selectable colorimetrically equivalent levels for use in the halftoning stage;

a printmasking stage for employing printmasks to establish temporal assignments of inking as among printing passes; and means for selecting tonal levels, from among said plural selectable colorimetrically equivalent levels, for use in the halftoning stage.

22. The apparatus of claim 21, wherein:
the halftoning stage is an error-diffusion stage.

23. The apparatus of claim 22, wherein:
the level-establishing means comprise:
  a lookup table that defines, for each input tonal level, a base level and an error value, and
  means for defining plural colorimetrically equivalent base levels; and
the selecting means comprise means for assigning different colorimetrically equivalent base levels to multiple successive colorimetrically adjacent input tonal levels.

24. The apparatus of claim 23, further comprising:
means for mapping each plural selectable colorimetrically equivalent level to a respective selectable colorimetrically equivalent printmask.

25. The apparatus of claim 22, wherein:
the selecting means are substantially randomized.

26. The apparatus of claim 22, further comprising:
means for mapping each plural selectable colorimetrically equivalent level to a respective selectable colorimetrically equivalent printmask.

* * * * *